F. EVANS.
CONNECTING DEVICE FOR REPAIRING ANTISKID TIRE CHAINS.
APPLICATION FILED FEB. 12, 1916.
1,259,971. Patented Mar. 19, 1918.
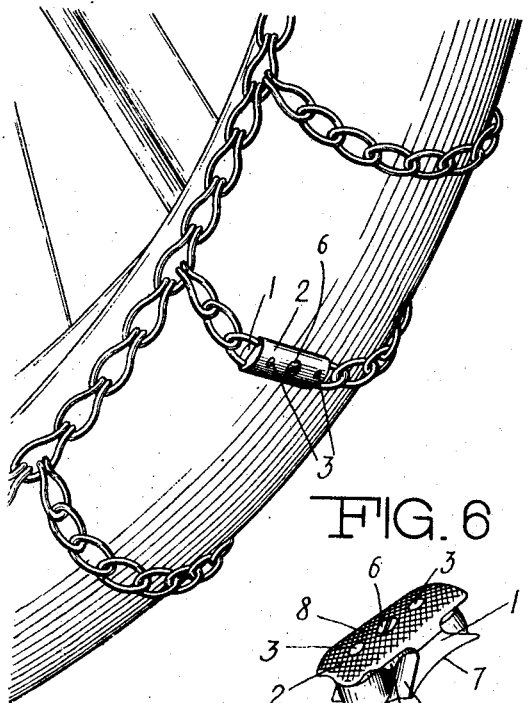
FIG. 1
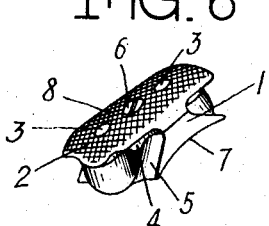
FIG. 6
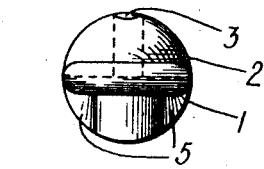
FIG. 4
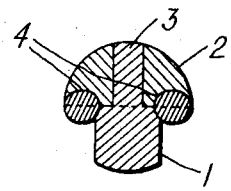
FIG. 5
FIG. 3
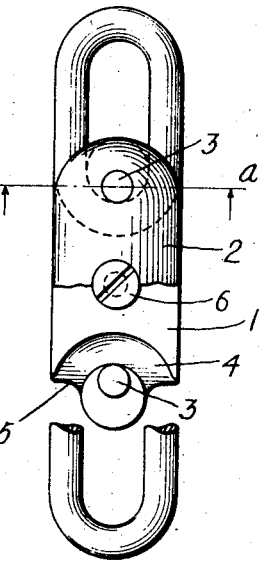
FIG. 2
INVENTOR.
BY
ATTORNEY

UNITED STATES PATENT OFFICE.

FRED EVANS, OF SUMMIT, NEW JERSEY, ASSIGNOR OF ONE-FOURTH TO WILLIAM P. HAMMOND AND ONE-HALF TO EDWARD C. HARTSHORNE, BOTH OF NEW YORK, N. Y.

CONNECTING DEVICE FOR REPAIRING ANTISKID TIRE-CHAINS.

1,259,971.          Specification of Letters Patent.      Patented Mar. 19, 1918.

Application filed February 12, 1916. Serial No. 77,840.

*To all whom it may concern:*

Be it known that I, FRED EVANS, a citizen of the United States, residing at Summit, in the county of Union and State of New Jersey, have invented certain new and useful Improvements in Connecting Devices for Repairing Antiskid Tire-Chains, of which the following, taken in connection with the accompanying sheet of drawings, is a full, clear, and concise description thereof.

My present invention relates particularly to a device for replacing a broken link in a tire chain, whereby the terminal links at the point of rupture may be brought into normal assembled relation, and whereby said terminal links will be protected, and the point of rupture made more efficient by reason of the wear-resisting ability of the connecting device.

In the accompanying drawing, I have illustrated preferable embodiments of my invention by way of example, and in which Figure 1 illustrates a fragmentary part of a tire chain mounted upon a similar part of a tire wheel in operative position, in the organization of which one form of my invention has been assembled showing the manner in which a cross chain may be expeditiously repaired when ruptured.

Fig. 2 is an enlarged detail of the form of device shown in Fig. 1, partly broken away, to show the manner in which the terminal links of the chain at the point of rupture coöperate with the connecting device.

Fig. 3 is a top plan view of a similar organization to that shown in Fig. 2, partly broken away, to more clearly illustrate the manner in which the terminal links are retained in operative position.

Fig. 4 is an end view of the device showing a terminal link in operative position.

Fig. 5 is a vertical cross-sectional view taken on line *a—a* of Fig. 3.

Fig. 6 is a perspective view of a modified form of the invention.

In the use of anti-skid chains, it frequently happens that the cross chains which coöperate with the tread portion of the tire, and, as a consequence, receive the wear, break or rupture, and usually this break or rupture occurs by reason of a single link rupturing first, and in order to repair the damage, an entire new cross chain is usually employed to replace the broken one.

In order to obviate the necessity of using an entirely new cross chain, I have devised a wear-resisting connecting device which is adapted to receive the terminal links of the broken chain at the point of rupture, and connect the same, and make a repair which has greater wear-resisting ability than an entirely new link would possess.

My connecting device comprises coöperating parts 1 and 2, the part 1 being provided with retaining studs 3 and semi-annular countersinks 4 conforming to the curvature of the link and adapted to receive the same. The part 2 is provided with apertures adapted to receive the retaining studs 3 and semi-annular countersunk portions complemental to the countersinks 4, so that when the two parts 1 and 2 are assembled over the terminal links, the ends of the terminal links are inclosed and retained in position by reason of their engagement with the retaining studs 3. The part 1 is chamfered away at 5 so as to provide for a limited swivel movement of the links when the chain is in use, and when used in connection with a chain which has been applied very tightly to the wheel, is in engagement with the tread of the tire, while the part 2 receives the wear from contact with the road. In order to hold the parts 1 and 2 in assembled relation, I may use a screw 6, or other equivalent connecting means.

In Fig. 6 I have illustrated a modified form of construction in which the base member is curved, as at 7, this curvature being complemental to the curvature of the tire upon which it is mounted, while the member 2 is roughened as at 8 to increase its ability to prevent skidding.

By the use of my device a repair in an anti-skid chain may be expeditiously made at slight expense, and the annoyance of running with broken chains is obviated.

While I have illustrated in the accompanying drawing one preferable embodiment of my invention, I will have it understood that I do not wish to be limited to the exact details of construction so illustrated and described herein as changes may be resorted to without departing from the spirit and scope of my invention, as defined by the appended claims.

Having thus described my invention, what I claim as new herein and desire to secure by Letters Patent is:—

1. A splice member consisting of a pair of sections and means for securing the sections together, each of said sections having a pair of link receiving seats on its inner face, said seats in the sections being opposed when the sections are assembled and extending across the member and through its ends.

2. A splice member consisting of a pair of sections and means for securing the sections together, each of said sections having a pair of link receiving seats on its inner face, said seats in the sections being opposed when the sections are assembled and extending across the member and through its ends, one of said sections being provided with an outer curved surface.

3. A splice member consisting of a pair of sections and means for securing the sections together, one section being provided with an outer wear-resisting surface and the other section being provided with an outer curved surface, each of said sections having a pair of link receiving seats on its inner face, said seats in the sections being opposed when the sections are assembled and extending across the member and through its ends.

4. A splice member consisting of a pair of sections and means for securing the sections together, each of said sections having a pair of link receiving seats on its inner face, said seats in the sections being opposed when the sections are assembled and extending across the member and through its ends, one of the sections being cut away to provide for limited swivel movement of a connecting link.

FRED EVANS.

Copies of this patent may be obtained for five cents each, by addressing the "Commissioner of Patents, Washington, D. C."